(12) United States Patent
Schmid

(10) Patent No.: US 8,170,082 B2
(45) Date of Patent: May 1, 2012

(54) CROSS-TALK MITIGATION IN GLOBAL NAVIGATION SATELLITE SYSTEMS

(75) Inventor: Andreas Schmid, Duisburg (DE)

(73) Assignee: Infineon Technologies AG, Neubiberg (DE)

( * ) Notice: Subject to any disclaimer, the term of this patent is extended or adjusted under 35 U.S.C. 154(b) by 706 days.

(21) Appl. No.: 12/328,791

(22) Filed: Dec. 5, 2008

(65) Prior Publication Data

US 2010/0142593 A1    Jun. 10, 2010

(51) Int. Cl.
*H04B 1/00*    (2006.01)
(52) U.S. Cl. ........ 375/147; 375/149; 375/150; 375/152; 375/316; 375/142; 375/143; 375/145; 342/356; 342/357.2; 342/357.21; 342/357.23; 342/357.25; 342/357.26; 342/357.28; 342/357.29; 342/357.42; 342/357.47; 342/357.49; 342/357.64; 342/357.65; 342/357.69
(58) Field of Classification Search .......... 375/147, 375/149, 150, 152, 316, 142, 143, 145; 342/356, 342/357.2, 357.21, 357.23, 357.25, 357.26, 342/357.28, 357.29, 357.42, 357.47, 357.49, 342/357.64, 357.65, 357.69
See application file for complete search history.

(56) References Cited

U.S. PATENT DOCUMENTS

| | | | |
|---|---|---|---|
| 6,473,032 B1* | 10/2002 | Trimble | 342/357.41 |
| 6,937,867 B2* | 8/2005 | Oda et al. | 455/456.1 |
| 7,298,780 B2* | 11/2007 | Zhengdi et al. | 375/150 |
| 7,912,011 B2* | 3/2011 | Tanno et al. | 370/331 |
| 2009/0225743 A1* | 9/2009 | Nicholls et al. | 370/350 |
| 2009/0289849 A1* | 11/2009 | Mantovani | 342/357.15 |

FOREIGN PATENT DOCUMENTS

| | | |
|---|---|---|
| EP | 1598677 B1 | 8/2007 |
| WO | 2007/003213 A1 | 1/2007 |
| WO | 2008/090323 A1 | 7/2008 |

OTHER PUBLICATIONS

Jose-Angel Avila-Rodriguez, et.al. How to optimize GNSS signals and codes for indoor positioning pp. 9 Institute of Geodesy and Navigation University FAF Munich.
Galileo Open Service, Signal In Space Interface Control Document, OS SIS ICD, Draft 1, p. 14, Feb. 2008.

* cited by examiner

*Primary Examiner* — Siu Lee
(74) *Attorney, Agent, or Firm* — SpryIP, LLC

(57) ABSTRACT

Embodiments related to cross-talk mitigation are described and depicted.

25 Claims, 12 Drawing Sheets

500

| ΔT [ms]/ Phase Offset [Chips] | 0.2 | 0.4 | 0.6 | ... | 1023 |
|---|---|---|---|---|---|
| 20 | Ts(1,1) | Ts(1,2) | Ts(1,3) | ... | Ts(1,N) |
| 21 | Ts(2,1) | Ts(2,2) | Ts(2,3) | ... | Ts(2,N) |
| 22 | Ts(3,1) | Ts(3,2) | Ts(3,3) | ... | Ts(3,N) |
| ... | ... | ... | ... | ... | ... |
| 100 | Ts(M,1) | Ts(M,2) | Ts(M,3) | ... | Ts(M,N) |

FIG. 5a

CROSS-TALK MITIGATION IN GLOBAL NAVIGATION SATELLITE SYSTEMS

BACKGROUND

Satellite based navigation (Satellite positioning) has become the prerequisite for a wide range of applications. To give examples, automobiles are nowadays very often equipped with global navigation satellite systems (GNSS) such as GPS or Galileo systems to track their routes or to effect payment of road fees. Many people use GNSS when acting outdoors during sports and other activities.

Further to the above, many emerging applications require positioning in deep urban and moderate indoor environments. For example, in emergency situations, it may be required to provide positioning in these difficult to access environments. However, current GPS receivers only provide limited service availability in these environments.

The success of satellite navigation in the mass consumer market such as integration into mobile phones will depend greatly on the service availability in urban canyons and moderate indoor environments. In order to meet these requirements the reception sensitivity of satellite navigation receivers needs to be substantially enhanced.

Attenuation, shadowing, and multipath fading effects in urban canyons and indoor areas frequently degrade the received GPS signal power by 35 dB or more. Therefore improved reception sensitivity is very important for GNSS receivers.

BRIEF DESCRIPTION OF THE SEVERAL VIEWS OF THE DRAWINGS

FIGS. 5*a* and 5*b* shows embodiments of implementing a starting time selection;

DETAILED DESCRIPTION

Figure 1:
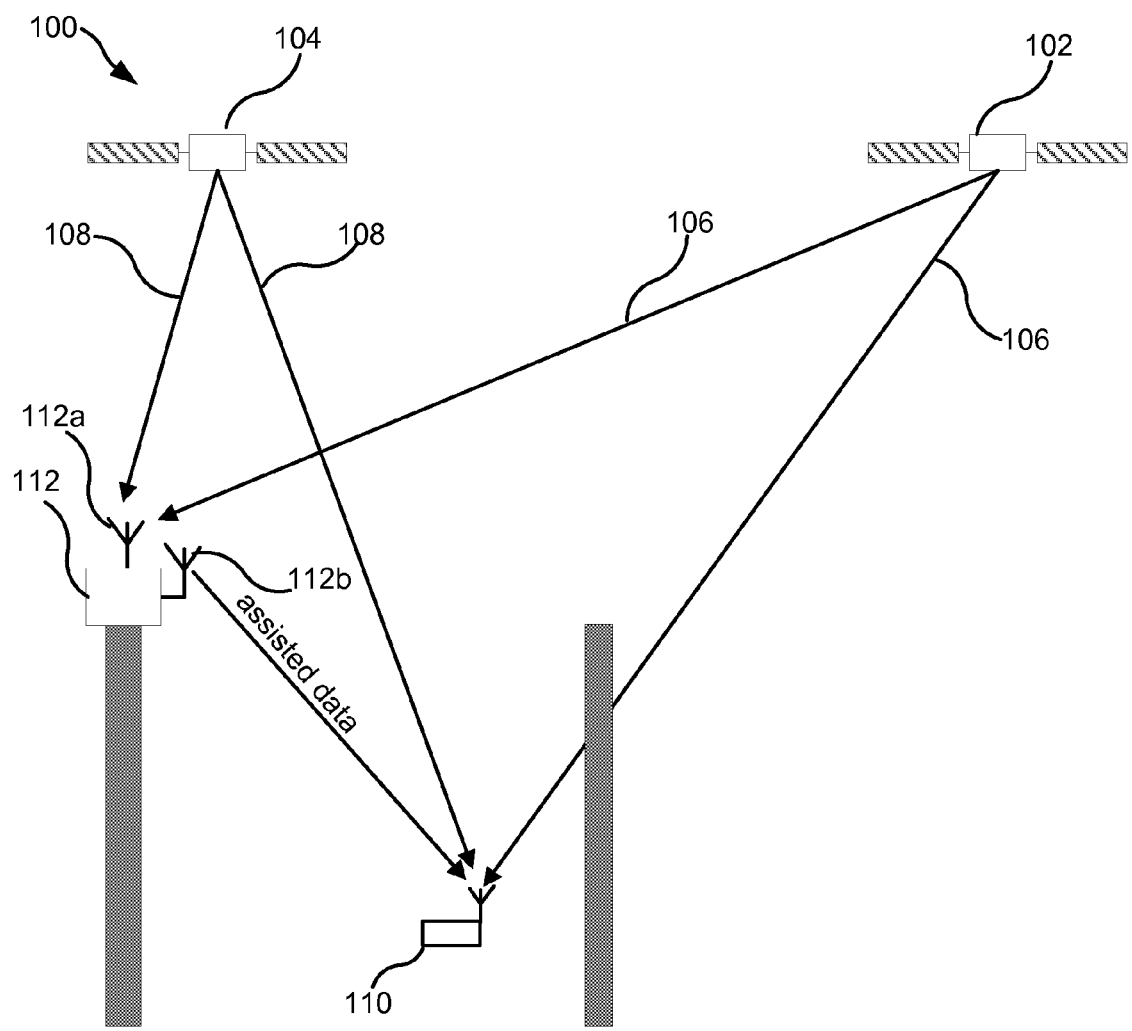
FIG. 1 shows a schematic block diagram according to an embodiment of the present invention.

The following detailed description explains exemplary embodiments of the present invention. The description is not to be taken in a limiting sense, but is made only for the purpose of illustrating the general principles of embodiments of the invention while the scope of protection is only determined by the appended claims.

In the exemplary embodiments shown in the drawings and described below, any direct connection or coupling between functional blocks, devices, components or other physical or functional units shown in the drawings or described herein can also be implemented by an indirect connection or coupling. Functional blocks may be implemented in hardware, firmware, software, or a combination thereof.

Further, it is to be understood that the features of the various exemplary embodiments described herein may be combined with each other, unless specifically noted otherwise.

In the various figures, identical or similar entities, modules, devices etc. may have assigned the same reference number.

The embodiments described below are directed to a new concept to increase receiver sensitivity in GNSS systems. The embodiments utilize a first direct-sequence spreading code and a second direct-sequence spreading code modulated on each GNSS signal for enhancing the receiver sensitivity. In the following the term "direct-sequence spread spectrum code" may also be referred to as "direct-sequence code" or simply "code". The described embodiments therefore allow a significant improvement of the sensitivity in weak signal areas such as in deep urban canyon or in-house environment. However, it is to be noted that the application of the described embodiments is not restricted to such environments.

FIG. 1 shows an embodiment of a global navigation satellite system (GNSS) 100. Global Navigation Satellite System 100 includes a first satellite 102 and a second satellite 104. Although FIG. 1 shows only two exemplary satellites 100 and 102, it is to be understood that the GNSS 100 includes a plurality of further satellites in order to allow a fully-operable navigation system. As will be described in more detail below, each satellite is transmitting from its orbit position down to earth a signal by utilizing a code sequence which is unique for the each satellite. Thus, satellite 102 is transmitting a first GNSS signal 106 and satellite 104 is transmitting a second GNSS signal 108.

FIG. 1 further shows a mobile GNSS receiver 110 in a situation where the first signal 106 is received with weak signal strength due to attenuation of the first signal 106 by an element such as a wall or roof obstructing the direct line of sight.

Typically in weak signal situations, assistance data is used to allow a positioning of the mobile receiver 110. The mobile receiver is then capable to provide navigation by only measuring the spreading code phases. Other information necessary for navigation is provided by base stations which receive the satellite signals at normal strength and transmit this information to the mobile receiver. Such information includes for example ephemeris data, almanac data, identifications which satellites are visible at the moment, information which spreading codes are used, information on the frequencies of the signals, clock information, and an estimate of the position.

FIG. 1 shows a base station 112 which receives the satellite signals by a first satellite receiver antenna 112*a* and transmits the assistance data information extracted from the received signals via a further antenna 112*b* to the mobile receiver. It is to be noted that for transferring the assistance data information, other RF frequencies, other data modulations or even other communication types can be used. For example, the assistance data can be transferred to the mobile receiver 110 using cellular telephone data communication techniques. The assistance data could in one embodiment even be transferred by a wired communication channel from the base station 112 to the mobile receiver 110.

The use of the assistance data may allow for the mobile receiver 110 a localisation without performing a data demodulation of the data transmitted by the satellites because all the data information of the signal which can be extracted is provided by the transmission of the assistance data to the mobile receiver except the exact phase of the received weak signal. With the assistance data, the integration period for signal acquisition at the mobile receiver 110 can be extended substantially raising the signal-to-noise-ratio to a level that permits acquisition detection of the weak signal.

Typically, the measurement of the code phase which the mobile receiver 110 has to perform for the localisation is provided by a correlator as part of the mobile receiver. The correlator applies after down-conversion of the received RF signal to a baseband signal a predetermined Chip code sequence associated with the respective satellite to the received baseband signal to determine the code phase. Determining the phase or measuring the phase of a code may herein after also be referred to by the more general term code phase synchronization.

It is to be noted here that the mobile receiver will for the weak signals not have to determine which satellites are visible and therefore which Chip code sequence have to be applied since the mobile receiver 110 can rely on the assistance data information. The code phase synchronization, i.e. the measuring of the code phase may be provided in the correlator by a multiplication of the predetermined Chip code sequence and the received signal and a summation or integration over the integration period. In case the phase of the received Chip sequence and the applied predetermined Chip sequence match, a correlation peak is obtained indicating the corresponding phase of the Chip code sequence.

With the assistance data, since data demodulation is not required, the integration period for signal acquisition can be extended substantially. This may raise the signal-to-noise-ratio in the weak signal environment to a level permitting acquisition detection.

However, in the situation shown in FIG. 1, a second signal 108 is received with normal or only small attenuated signal strength at the mobile receiver 110 since the line of sight is not obstructed by elements or is relative to the signal 106 only attenuated to a small extent by surrounding elements.

In such a situation where one or more of the satellite signals, i.e. signal 108, is much stronger (such as 20 dB or more) than one or more of the other satellite signals, i.e. signal 106, a problem arises for the detection of the weak signal because of the cross-correlation of the strong signal with the weak signal. The strong signal is here influencing or prohibiting the determining of the phase and therefore the determination of the position. Typically the direct-sequence spreading codes used in GNSS such as the Gold code are optimized to yield good autocorrelation behaviour as well as good cross-correlation behaviour. However, since autocorrelation and cross-correlation are opposing trends, codes optimized for both have a non-zero cross-correlation. Therefore, integration of two different Chip code sequence of the same code will not yield exactly zero, i.e. cross-correlation is not fully cancelled. However, in the presence of a strong signal, the weak auto-correlation peak may be in the range or even smaller than cross-correlation peaks resulting from the cross-correlation of the strong signal with the small signal.

In order to address the cross-correlation influence of the strong signal, embodiments described herein utilize GNSS signals which are each modulated by a first direct-sequence spreading code and a second direct-sequence spreading code. The second direct-sequence spreading code may have a code sequence interval with shorter time interval (code period) and a higher Chip frequency compared to the first direct-sequence spreading code. Therefore, the second direct-sequence spreading code utilizing the shorter code interval with higher Chip rate may also be referred to as a primary code while the first direct-sequence spreading code utilizing a code sequence with longer time duration and lower Chip rate may be referred to as a secondary code. The first direct-sequence spreading code includes a set of Chip sequences wherein each satellite is assigned to one particular Chip sequence of this set. Furthermore, the second direct-sequence spreading code includes a set of Chip sequences wherein each satellite is assigned to one particular Chip sequence of this set to allow identifying of the signal transmitted by this satellite.

Figure 7A:
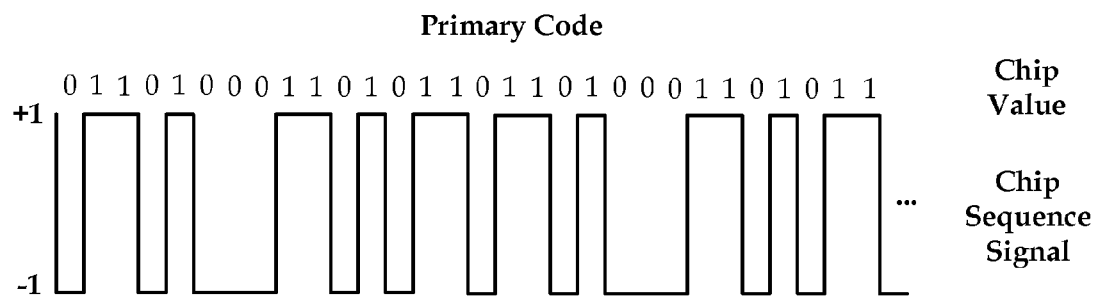
FIGS. 7*a-c* show Chip sequences to illustrate a primary and secondary code modulation.
Figure 7B:
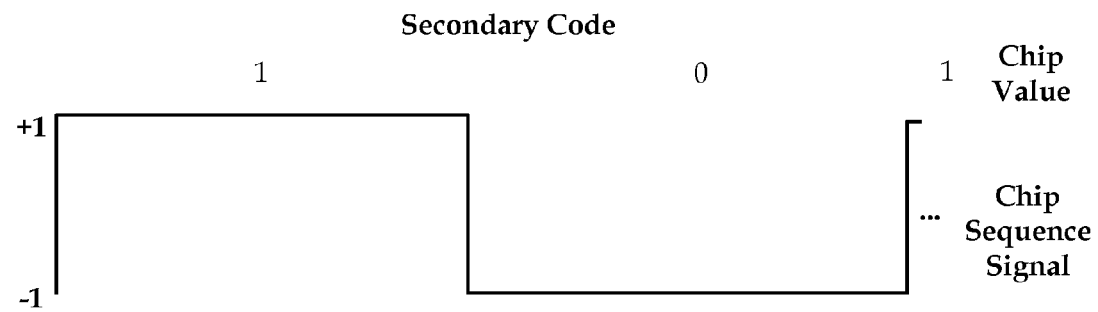
Figure 7C:
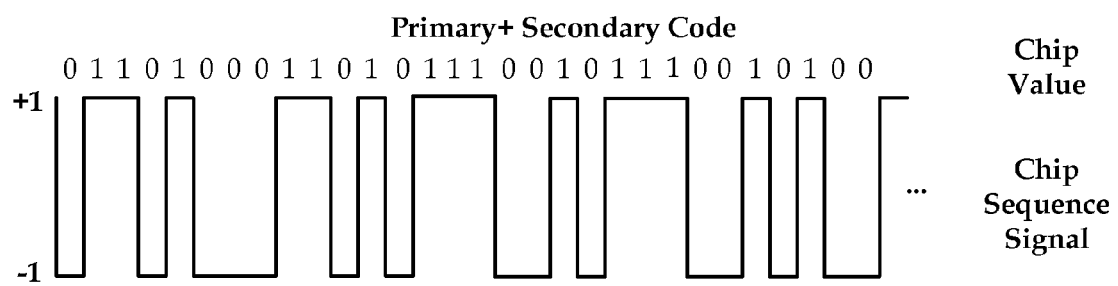

FIGS. 7a-7c shows for illustration one embodiment of a signal modulated by a first direct-sequence spreading code and a second direct-sequence spreading code. In this embodiment, the duration of one Chip of the first code (Chip interval of the first code) corresponds to the duration of a full Chip sequence of the second code (Code interval of the second code). In other words, in this embodiment each time the entire Chip sequence of the second direct-sequence spreading code is transmitted (one code interval of the second code), one Chip of the first direct-sequence spreading code is transmitted (one Chip interval). FIG. 7a shows a Chip sequence and the corresponding Chip values of the second code with shorter code time period (primary code). The second code has a Chip length of 15 Chips, i.e. the Chip sequence repeats after each 15 Chips. FIG. 7b shows the first code with the longer code period (secondary code). The Chip time period of the first code is identical to the code interval (code period) of the faster second code, i.e. one Chip period of the longer first code corresponds to the full 15 Chips of the faster second code. FIG. 7c shows the combination of both. By combining the first and second code, a unique code is obtained with a Chip sequence over the first code interval with the faster Chip rate of the second code.

In other embodiments, the second direct-sequence spreading code may have a higher number of Chips in the code sequence compared to the number of Chips in the code sequence of the first direct-sequence spreading code. For example, in one embodiment, the longer first code may have a Chip sequence of 25 Chips while the shorter second Code may have a Chip sequence of 4092 Chips.

The first spreading code and the second spreading code are modulated at the satellites on a RF carrier such as a E1 carrier used by a Galileo system or a L1 carrier used by a GPS system. Modulation is performed using BPSK (Binary Phase Shift Keying) or BOC (Binary Offset Carrier Modulation) resulting that a Chip value of 0 is transmitted as the inverse of a Chip value 1. The first and second direct-sequence spreading code may be combined and modulated on the same phase of the RF signal or may be modulated on different phases of the RF signal such as a I-phase and a Q-phase of the RF signal. Examples of the above are the E1A and E1B codes, the E5A I codes E5A Q codes, E5 BI codes and E5B Q codes used by the Galileo system.

Figure 2:
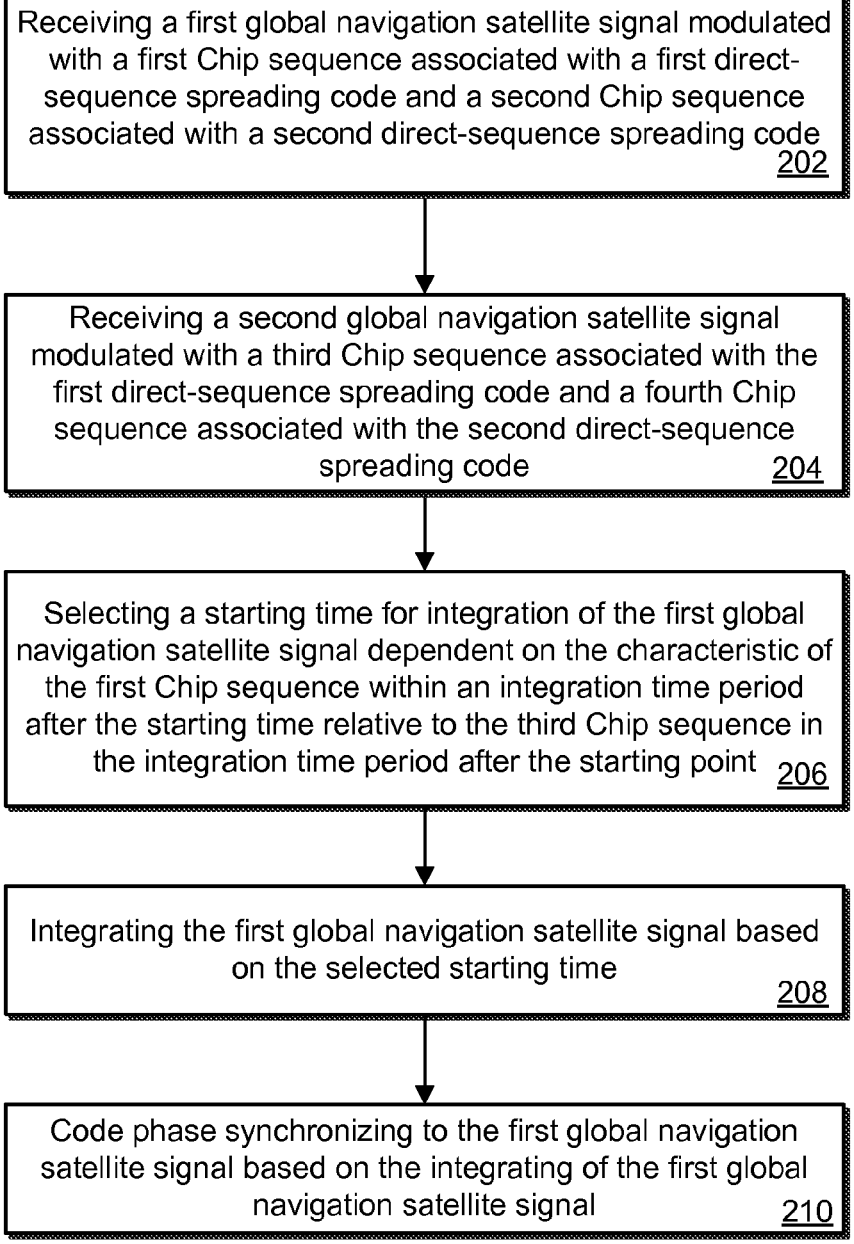
FIG. 2 shows a flow chart diagram according to an embodiment.

Referring now to FIG. 2, an exemplary GNSS receiving process 200 will be described. The flow process 200 described in FIG. 2 may be utilized for example in FIG. 1 for providing an autocorrelation in weak signal environment but may also be used in other environments and any other GNSS. At 202, a first GNSS signal is received which is associated with a first satellite. As described above, the first GNSS signal has been modulated with a first Chip sequence associated with a first direct-sequence spreading code and a second Chip sequence associated with a second direct-sequence spreading code. The first direct-sequence spreading code has a code time period which is longer than a code time period of the second direct-sequence spreading code. Therefore, the first direct-sequence spreading code may herein also be referred to as the secondary code while the second direct-sequence spreading code may herein be referred as the primary code.

Furthermore, at 204, a second GNSS signal associated with a second satellite is received. The second global navigation satellite system signal is modulated with a third Chip sequence associated with the first direct-sequence spreading code and a fourth Chip sequence associated with the second direct-sequence spreading code.

Since the first GNSS signal and the second GNSS signal are transmitted from different satellites, the first and the third Chip sequence as well as the second and the fourth Chip sequence are different.

In other words, the first and third Chip sequences are different Chip sequences which have the same code time period and belong to the same code family, i.e. the first direct-sequence spreading code family. The second and fourth Chip sequences are also different Chip sequences which have a same code period shorter in time than the code period of the first and third chip sequence. The second and fourth Chip sequences belong also to a same code family namely the second direct-sequence spreading code family. In one example, the first and third Chip sequences are respective Chip sequences of the secondary code and the second and fourth Chip sequences are Chip Sequences of the primary code.

As described above, the first signal may be weaker than the second signal. In one embodiment, the first signal is by about 10 dB or more weaker than the second signal. In another embodiment, the first signal is 20 dB or more weaker than the second signal.

While the receiving of the first and second GNSS signals has been separated in two blocks 202 and 204 for more clarity, it is to be noted that the receiving of the first and second GNSS signals may be performed in parallel and may also be performed continuous.

At 206, a starting time for integration of the first GNSS signal is selected. The selection is made dependent on the characteristic of the first Chip sequence within an integration time period after the starting time relative to the third Chip sequence in said integration time period after the starting point. At 208, the first GNSS signal is integrated based on the selected starting time. In embodiments, the integration may be achieved by summing up discrete samples of the respective signal. A local copy of the first Chip-sequence which is pre-known to the mobile receiver is then multiplied with the received signal and integration is performed thereafter. In embodiments, the integration is an autocorrelation integration used in direct-sequence spreading code receivers or CDMA receivers for determining the autocorrelation of the received signal. The integration may be an integration within a single shot measurement. In single shot measurement, the only information needed is the phase information, i.e. at what phase the pre-known signal is actually received, in order to determine the position. Other information is provided by assistance data information from a base station or other stations as described above.

At 210, a code phase synchronizing to the first GNSS signal based on the integrating of the first GNSS signal is performed. In embodiments, the code phase synchronization may be a determining of the autocorrelation peak in the correlator. The autocorrelation peak then indicates a situation where the phase of the received signal matches the phase of the pre-known signal applied during the integration. As described above, the code phase synchronization may be a code phase synchronization or correlation in a single shot operation. However, other operation modes may be provided in other embodiments. Thus, code phase synchronization for the first GNSS signal may be interpreted here in a broad sense including any kind of phase determining, phase measuring or phase matching of the received first GNSS signal in any operation mode. It is to be noted that the integration provided in 208 and the synchronization 210 may be part of an acquisition in weak signal environments.

It is further to be noted that although the integration is performed at the mobile receiver, for example mobile receiver 110, the integration starting point can be determined at the mobile receiver as well as some other unit such as the base station 112. In some embodiments which will be described below in more detail, the mobile receiver may receive the determined exact starting point directly from the base station 112. In these embodiments, the integration starting time is determined at the base station 112 based on the signals 106 and 108 received at the base station 112 and the mobile receiver 110 selects this transmitted starting time value as the time point for starting integration. The integration starting time may be incorporated or appended to the assistance data information transmitted from the base station 112 to the mobile receiver 110. The integration starting time can be represented in many ways. For example, in embodiments the integration starting time may be represented by using units such as a digital number indicating the starting time relative to time points of the strong signal such as a first Chip of the of the strong signal, a digital number indicating a phase of a signal, a digital number indicating fractional or full multiples of a reference unit such as integer or fractional units of the faster Chip time period or other representations.

In some embodiments, the starting time may be determined at the mobile receiver from the received information. Here, the mobile receiver may obtain from the base station 112 information allowing reconstructing at least the third Chip sequence time synchronous with the actual received Chip sequence. In other words, when receiving the information at the mobile receiver 112, the mobile receiver 112 is capable of predicting the phase of the first Chip sequence, i.e. the phase of longer duration code of the stronger second signal. To determine the phase, the mobile receiver may use other information known by the mobile receiver or pre-known in addition to the information received.

Time synchronous as used herein may include also some deviation from the exact time synchronicity provided that the deviation is fairly small compared to the Chip time period of the first direct spread spectrum code. The transmitted information for time synchronization may be part of the assistance data may be appended to the assistance data or may be transmitted separately. The base station 112 may in some embodiments use a separate channel to transmit this information to the mobile receiver 110. In some embodiments, this information may be a flag or a time indicator indicating when a predetermined point of the third Chip sequence is received. The flag or time synchronous indication may be represented in many ways or by many units including digital numbers indicating a phase of a signal, a number of fractional multiples of a Chip time period etc.

As will be described now in more detail, the selection of the starting of the integration time period allows a reduction or elimination of the above described cross-correlation effect induced by strong GNSS signals on the weak GNSS signals.

Assuming for the moment that GNSS signals are each modulated only by one direct-spreading code $c^n$, (where n=1 for the first GNSS signal and n=2 for the second GNSS signal), the combined correlation function can be obtained by:

$$R(\tau - \hat{\tau}) = \sum_{v=0}^{N-1} c_{v+\hat{\tau}}^{(1)} \left[ \sqrt{2P^{(1)}} \, c_{v+\tau}^{(1)} + \sqrt{2P^{(2)}} \, c_{v+\tau}^{(2)} \exp(j2\pi \cdot f_d \cdot (v + \tau)) \right]. \quad \text{Eq. 1}$$

The combined correlation function is the result of applying the pre-known Chip sequence $c_{v+}^{(1)}$ at phase $\hat{\tau}$ to a signal including the Chip sequences $c_{v+\tau}^{(1)}$ at phase $\tau$ under the influence of the Chip sequence $c_{v+\tau}^{(2)}$ of the second signal. Herein, v denotes the running index for the Chip sequence of each code, i.e. v=1, 2, 3 ... N−1 when the code includes N Chips. The above occurs when a received signal which includes the first signal and a second interfering signal is despread (decoded). It is assumed now that the first signal which is to be despread is much weaker than the second signal. $P^{(1)}$ denotes here a carrier power factor of the weak first signal and $P^{(2)}$ denotes a carrier power factor of the strong second signal. The weak signal with carrier power $P^{(1)}$ and spreading code $c_{v+\tau}^{(1)}$ is despread with the correct local code $c_{v+\tau}^{(1)}$. The strong interfering signal with carrier power $P^{(2)}$ has a different spreading code $c_{v+\tau}^{(2)}$ such that the transmitter of each signal can be identified by the spreading code assigned to the transmitter.

Figure 3A:
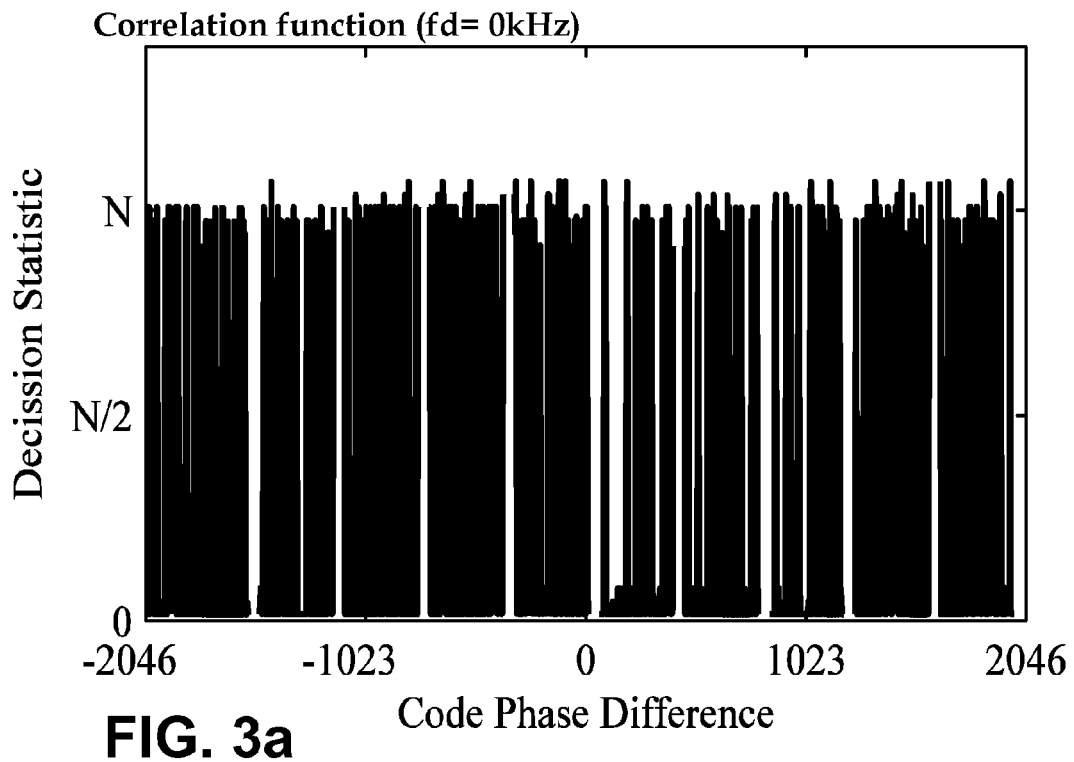
FIGS. 3*a-e* show correlation function diagrams according to embodiments.
Figure 3B:
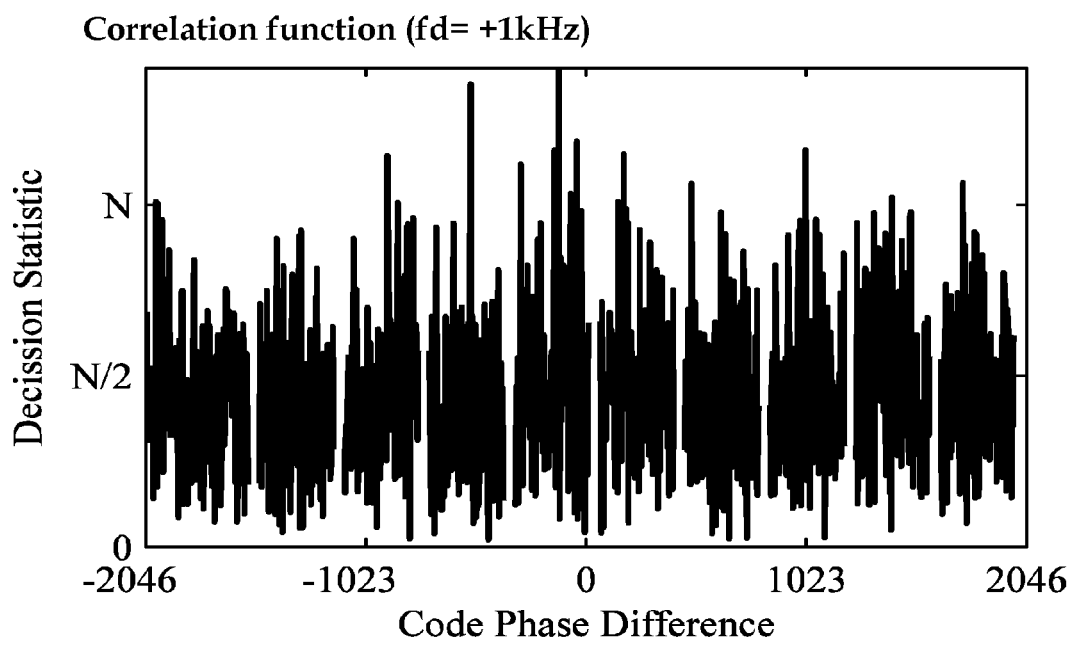
Figure 3C:
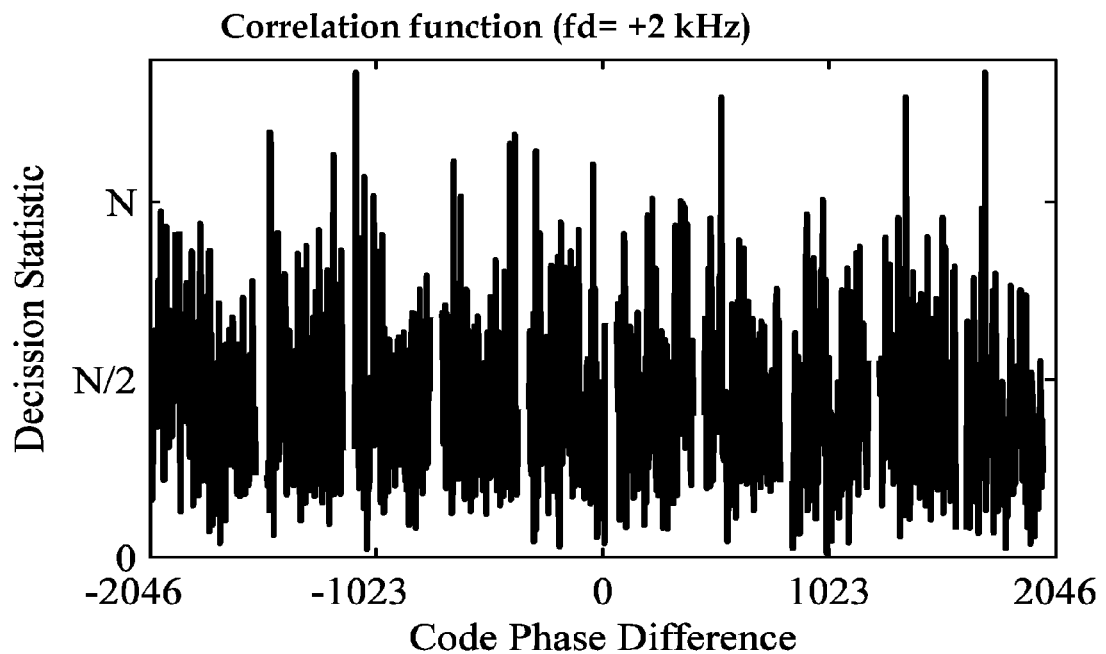
Figure 3D:
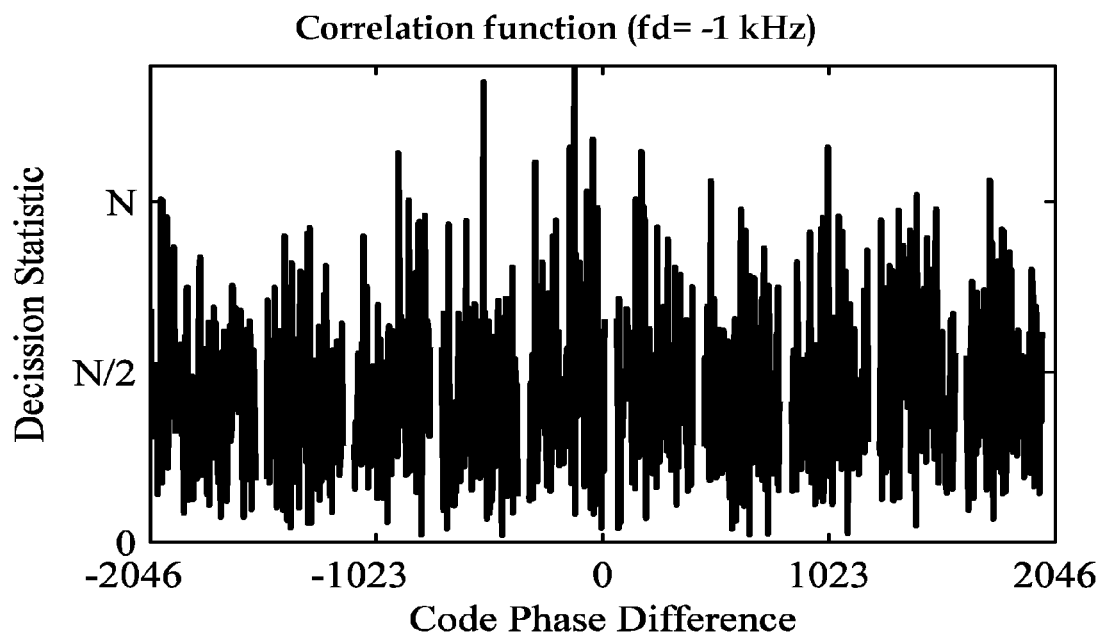
Figure 3E:
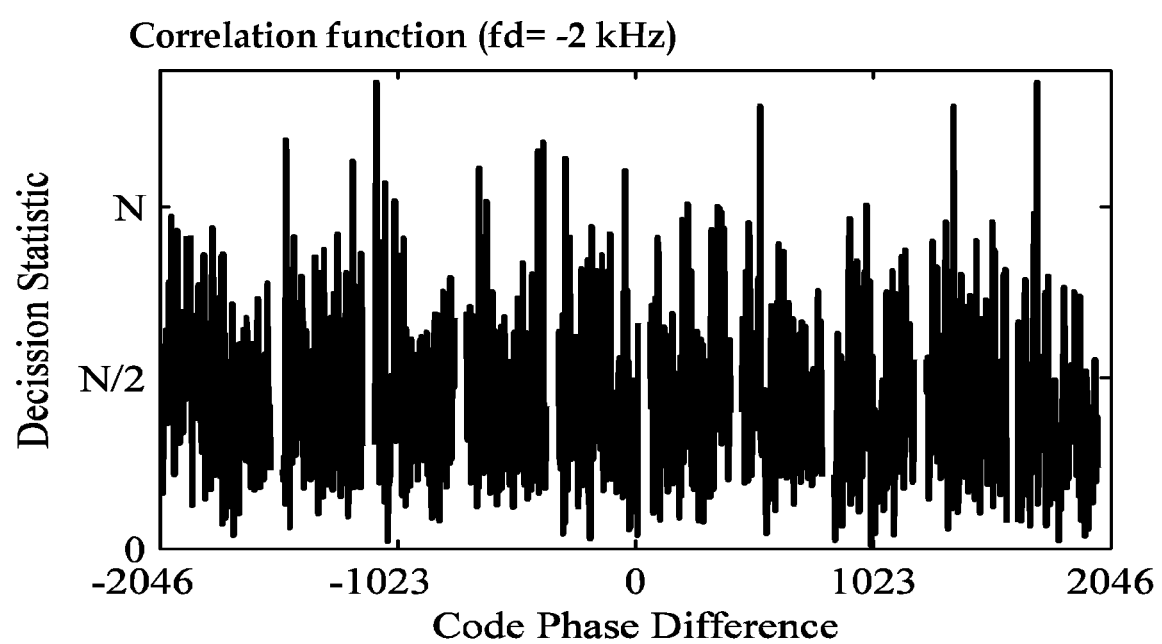

A relative frequency offset parameter $f_d$ represents a difference of the frequency offset of the second signal relative to the frequency of the first signal. Every code interval produces a correlation function with the autocorrelation peak in the middle and cross-correlation on the side. In the case of zero frequency deviation, the spreading code has around 24 dB isolation between the autocorrelation peak and the cross-correlation values. In the case of non-zero frequency deviation, the cross-correlation function becomes more erratic, with the maximum cross-correlation values being only 20 dB below the correlation peak. FIGS. 3a-3e depict simulated diagrams of the correlation function when a weak GNSS signal is correlated with the correct local despreading code in the presence of a strong GNSS signal inducing cross-correlation. FIG. 3a shows a simulation where the relative frequency offset parameter $f_d$ is zero, i.e. the first and second GNSS signals have a same frequency offset. FIGS. 3b and 3c show simulations where the relative frequency offset parameter $f_d$ is equal to +1 kHz (FIG. 3b) and +2 kHz (FIG. 3c). FIGS. 3d and 3e show simulations where the relative frequency offset parameter $f_d$ is equal to −1 kHz (FIG. 3d) and −2 kHz (FIG. 3e). Each of the FIGS. 3a-3e show as ordinate the combined correlation function of a weak signal in the presence of a strong signal having 20 dB more power according to the above formula. Each of the FIGS. 3a-3e further shows as abscissa the phase offset $\hat{\tau}-\tau$ in units of full Chip periods. In the examples of FIGS. 3a-3e, each code consists of 1023 Chips.

It can be observed for each of the examples shown in FIGS. 3a-3e that the expected autocorrelation peak is not clearly determinable in view of the cross-correlation resulting from the strong second signal.

By providing for each of the signals the secondary code and selecting the starting of integration as described with respect to FIG. 2, a significant improvement can be achieved as will be outlined below.

This can be for example used in situations of weak signals, wherein positioning is obtained by combining assistance data and single shot positioning to obtain the navigation. As described above, in such situations, the task of the satellite navigation receiver can be reduced to a measurement of the spreading code phases, i.e. code phase synchronizing. With assistance data, data demodulation is not required and the integration period for signal acquisition can therefore be extended substantially.

However, only raising the integration time will not receive better results in the presence of interfering strong signals because the cross-correlation contribution of the strong signal will also be integrated over the extended integration time and therefore the ratio of the autocorrelation peak to the cross-correlation peaks is maintained.

With the additional code for each signal, i.e. the first code as described with respect to FIG. 2 for the first signal and the third code described with respect to FIG. 2 for the second signal, a significant improvement can however be obtained if the starting time of the integration is properly selected, as will be outlined below with respect to FIGS. 4a-4c.

Selection of the starting time for the integration may in embodiments be determined based on the length of a preselected integration interval and the characteristics of the additional codes for the first and second signal (first and third Chip sequences) during the preselected integration interval. In more detail, in one embodiment, the starting time may be dependent such that when the integration starts at the starting point for the integration interval, a parameter is at a minimum or a local minimum or at least near a minimum or a local minimum for the selected starting time compared to other potential starting times. The parameter is hereby dependent on the characteristic of the first Chip sequence for a time interval after the starting time relative to the third Chip sequence for said time interval. If each Chip of the first and third Chip sequence represents in the signal either a value +1 or a value −1 such as in BPSK, the parameter represents in one embodiment the absolute value for the dot product of the values of the first Chip sequence signal and the third Chip sequence signal integrated over the integration time period. Mathematically this can be expressed as $$T_s = \mathrm{argmin}\left| \int_{T_s}^{T_s+\Delta T} \tilde{c}^{(1)}(t)\tilde{c}^{(2)}(t+\Delta\tau)dt \right|. \qquad \text{Equ. 2}$$

Here Ts represents the starting time, $\Delta T$ represents the integration interval, $\tilde{c}^{(1)}$ represents the first Chip sequence signal (the Chip sequence of the secondary code of the first signal) having the two possible values +1, −1 and $\tilde{c}^{(2)}$ represents the third Chip sequence signal (the Chip sequence of the secondary code of the second signal) having the two possible values +1, −1, $\Delta\tau$ represents the code phase difference between the two code sequences, and t the time. In some embodiments, since the smallest absolute value is zero, the above can also be defined as to select the starting point for integration such that the absolute value of the above integration is zero or closest to zero. By selecting the starting point according to the above, a distribution within the integration interval is then obtained in which the time during which the first Chip sequence $\tilde{c}^{(1)}$ and the third Chip sequence $\tilde{c}^{(2)}$ have the same value (either both +1 or both −1) equals the time in which the first Chip sequence $\tilde{c}^{(1)}$ and the third Chip sequence $\tilde{c}^{(2)}$ have differing values. In some embodiments, instead of requesting that the above integral is at a minimum, selection of the integration starting point may be such that the above integral is at a local minimum.

Is to be noted that with a preselected integration interval and with the Chip sequences being predetermined for each satellite, once the information of the received first and third Chip sequences and the phase offset between these two Chip sequences is obtained, solutions to the above equation may be predetermined. Therefore, according to one embodiment, a look-up table may be established for each two Chip sequences providing for each integration interval and each phase offset a starting time. An example of a look-up table 500 for two codes $\tilde{c}^{(1)}$, $\tilde{c}^{(2)}$ is shown in FIG. 5. For each value of a phase offset between the codes $\tilde{c}^{(1)}$ and $\tilde{c}^{(2)}$ and each preselected integration interval, a starting time Ts(x,y) is provided which fulfills the above minimum criteria. Since the look-up table accounts only for discrete values, in case the actual phase offset and/or the integration interval is between the values provided by the look-up table, interpolation techniques may be used to select the starting time. In some situations, there may be for each phase offset and integration time two or more equal solutions, i.e. the integral may be zero for more than one parameter. In this case, the starting time for integration can be selected from these values. One way to do so is to choose the starting time closest to the actual time. However other ways to choose are possible.

In other embodiments, instead of a look-up table, the above equation may be solved in real time using existing known optimization techniques.

Person skilled in the art may recognize that there are many well known ways to determine a minimum which can be applied to determine Ts in accordance with Equ. 2.

In some embodiments, the selection of the integration starting time can be made such that the value of the integral of Eq. 2 is below a predetermined threshold rather than at a minimum. The threshold may be set dependent on the actual receiving conditions at the position of the mobile receiver for example the relation of the power of the received weak signal to the power of the received strong signal. In one embodiment, the threshold is set such that the cross-correlation effects are sufficient lower than the autocorrelation peak. For example, the threshold may be set such that the cross-correlation effects are 10 dB lower than the autocorrelation peak.

Mathematically this can be expressed by $$\left| \int_{T_s}^{T_s \Delta T} \tilde{c}^{(1)}(t) \tilde{c}^{(2)}(t + \Delta \tau) dt \right| \leq \text{Threshold} \qquad \text{Eq. 3}$$

Figure 5B:
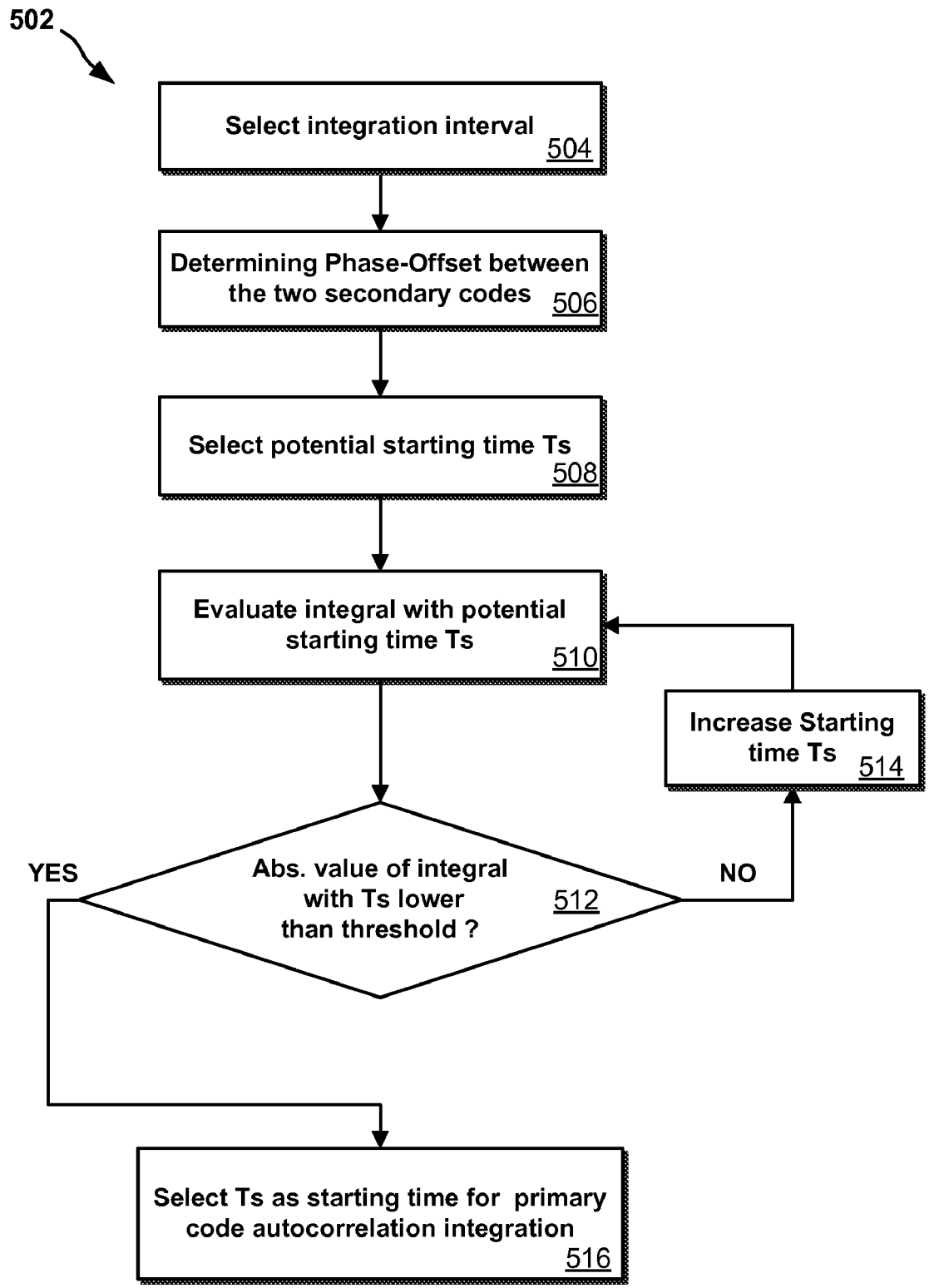

The starting time may then be selected by selecting a potential starting time and varying the potential starting time until Eq. 3 is satisfied. For illustration purpose, a flow chart of a very simple process 502 to determine the starting time in accordance with Equ. 3 is shown in FIG. 5b. The process 502 starts at 504 with selecting the integration interval. As described before, the integration interval may be selected dependent on different factors such as the environment, the receiving strength of one or more of the GNSS signals etc.

Then at 504 the phase offset between the two secondary code sequences (first and third Chip sequences) is determined. It is to be noted that while for the stronger second GNSS signal the phase of the secondary code (third Chip sequence) may be determined based on the received GNSS signal, the first code of the weak first GNSS signal (first Chip sequence) may not be directly determined from the received GNSS signal. The phase-offset between the two Chip sequences can however be determined at a base station 112 and transmitted to the mobile receiver as described above or the phase offset may be determined based on information allowing the time synchronous reconstruction of the secondary code of the weak first signal at the mobile receiver.

Then at 508 a potential integration starting time point Ts is selected. At 510, the integral of Eq. 3 is evaluated with the potential integration starting time Ts. At 512 it is determined whether the absolute value of the integral is lower than the predetermined threshold. If not the starting time Ts is increased and the evaluating of the integral at 510 as well as the determining at 512 is repeated. If it is determined in 512 that the absolute value of the integral is lower than the threshold, the process proceeds to 516 wherein Ts is selected as starting time for the primary code autocorrelation integration.

In embodiments, when the integral time is long enough compared to the Chip period of the secondary code, the integral can be approximated by a sum which obtains then instead of Eq. 2 as criteria for selecting the starting time $$Ts = \operatorname{argmin} \left| \sum_{v=v(Ts)}^{v=v(Ts+\Delta T)} \tilde{c}_v^{(1)}(t) \tilde{c}_v^{(2)}(t+\tau) \right|. \qquad \text{Eq. 4}$$

In other embodiments, the length of the integration interval may not be preselected prior to the determining of the starting time but may be determined in an optimization process together with the starting time. A certain range may be allowed for the integration interval. Since the integration interval is now variable within a certain range, by using intelligent optimization algorithms such as multi-dimensional optimization algorithms, a fast determination of a starting point for the integration can be made for an allowable integration interval. The range for variation of the integration time may be dependent on the conditions at the mobile receiver such as the signal strength of the strong signal and/or the signal strength of the weak signal.

The above described operations for selecting the integration starting time may be implemented in a computer program with an executable computer code. Therefore, embodiments include machine readable instruction code to execute the above described operations and processes when the code is executed on a computer. Furthermore, embodiments also include storage media to store the machine readable instruction code.

In one embodiment, the computer code may, when executed on the computer select a starting time for integrating the first GNSS signal associated with the first satellite based on characteristics of the first Chip sequence relative to the third Chip sequence. The computer on which such programs may be executed may be for example a computing entity provided on a semiconductor chip using software or firmware. The semiconductor chip may for example be a chip as provided in mobile phones, dedicated navigation devices, laptops or other portable devices.

In one embodiment, the computer readable program code is a program code which when executed on a computer determines a starting time of an autocorrelation integration for the primary direct-sequence spreading code of the first signal based on a phase difference between the secondary code Chip sequences of the first and second GNSS signal. Phase difference between the two Chip sequences may include any information which relates to a time difference between the two secondary codes. To illustrate an example, the phase difference between the two secondary codes may be the time difference $\Delta T = T1 - T2$ between two time points T1 and T2. T1 is here the point in time when the first Chip of the Chip sequence of the secondary code for the first signal (first Chip of the first Chip sequence) is received while T2 is the time point when the first Chip of the Chip sequence of the secondary code for the second signal (first Chip of the third Chip sequence) is received. In one embodiment, the program code includes when executed on a computer an inputting of first information identifying a secondary code related to a first satellite and inputting second information identifying a secondary code related to a second satellite and calculating the integration starting time based on characteristics of the two secondary code Chip sequences. Since the Chip sequences assigned to respective satellites are pre-known to all receivers, the first information may just be a number assigned to each satellite.

It is to be noted here that once the starting time for the integration is selected (determined) as described above, the autocorrelation integration for the second Chip sequence (primary code of the first signal) is exactly triggered to start at this time instant. For example, in embodiments, the integration within the acquisition process is triggered to start at exactly this time instant. By the end of the acquisition interval, the differing Chip sequences of the secondary codes result in a mitigation of the cross-correlation between the desired weak Galileo signal and the interfering stronger Galileo or GPS signal as will be described below.

If the secondary spreading codes are considered on a Chip by Chip basis, they effectively change the polarity of the correlation function of the primary spreading code. A secondary code Chip valued 1 leads to a positive primary code correlation peak and a secondary code Chip valued 0 leads to a negative primary code correlation peak as the Chip value 0 represents an inverse (−1) of the signal in BPSK (Binary Phase Shift Keying). As described above, the secondary code is rather slow. For example, in an embodiment of a Galileo system, the secondary Chip period is 4 ms for the civilian Galileo L1 signals. Since the secondary spreading codes differ for the different satellites, the weak Galileo signal to be acquired and the stronger interfering signal have different secondary spreading sequences.

If now the acquisition process starts at exactly or close to a time when half of the secondary code Chips during the acquisition interval have equal values for the weak signal and the stronger interfering signal and half of the secondary code Chips have different values, then the cross-correlation cancels out to zero or close to zero. These starting times may be selected by one of the above described selection processes. The approach aids therefore the acquisition process with the required information to resolve the cross-correlation problem of current satellite navigation receivers by efficiently combining the secondary spreading codes of the future Galileo signals. This works for example for interfering GNSS signals such as Galileo or GPS signals, when a weaker signal is to be acquired.

While for the case of short integration intervals, the algorithm or the look up table provides a time instance when the two interfering signals have the same or close to the same secondary Chip value for one Chip and a different secondary Chip value for the following Chip longer integration intervals may require to break up the integration interval (period) into multiple smaller integration intervals (periods) and applying the selection processes as described above for each of the smaller integration intervals.

Figure 4A:
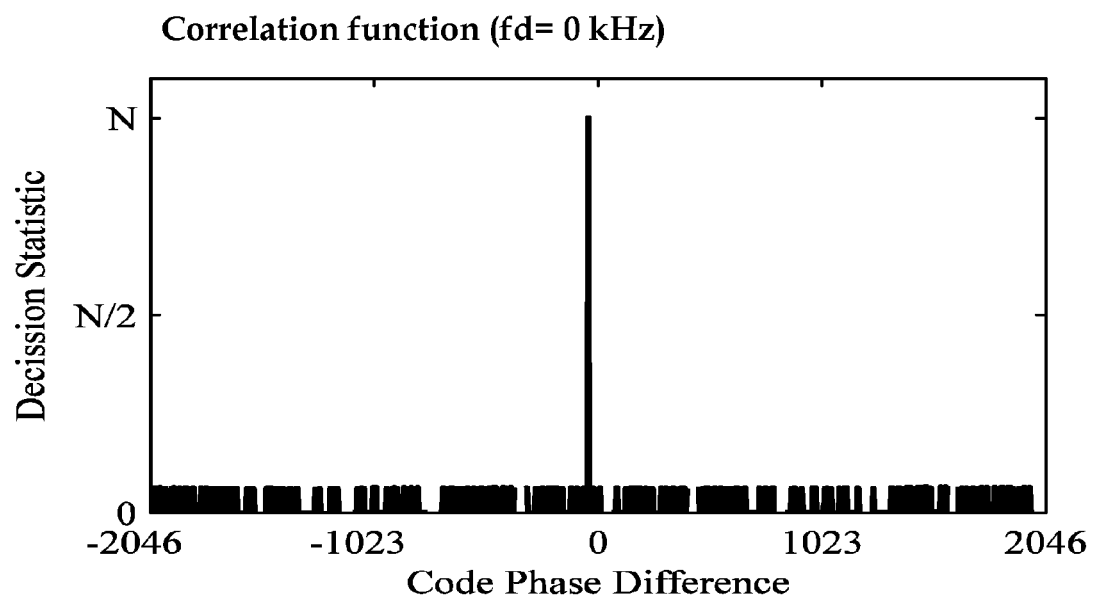
FIGS. 4*a-e* show correlation function diagrams with cross-talk mitigation according to embodiments.
Figure 4B:
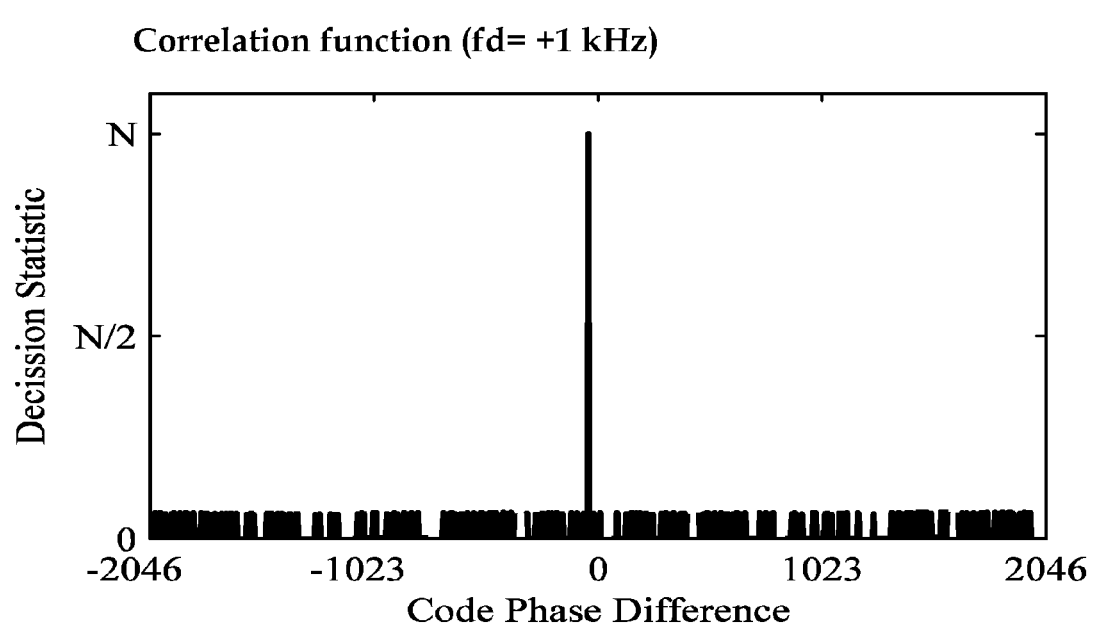
Figure 4C:
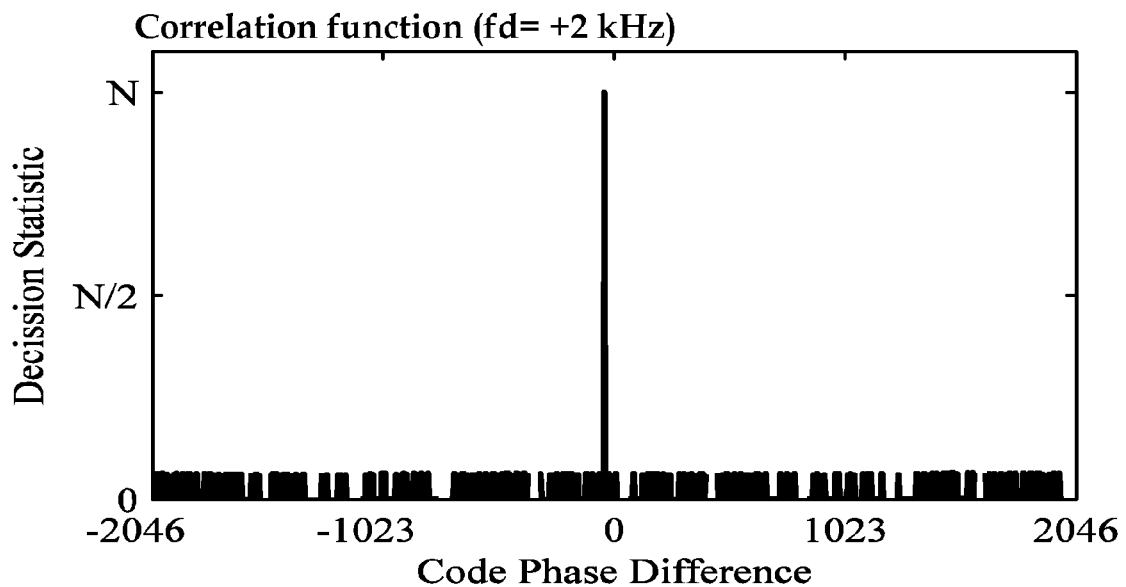
Figure 4D:
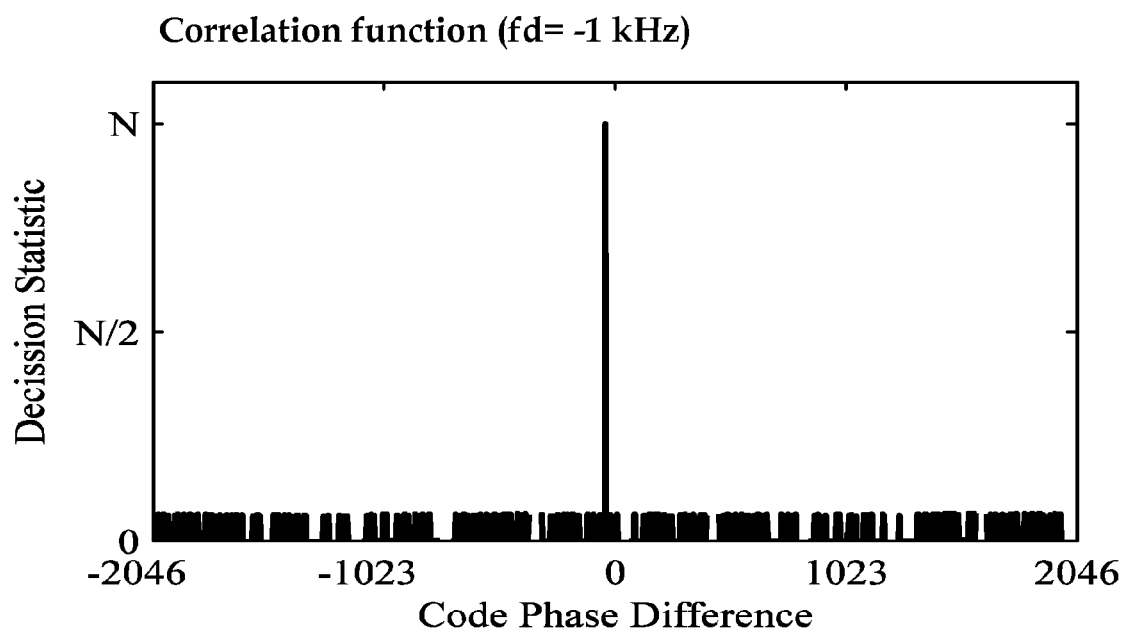
Figure 4E:
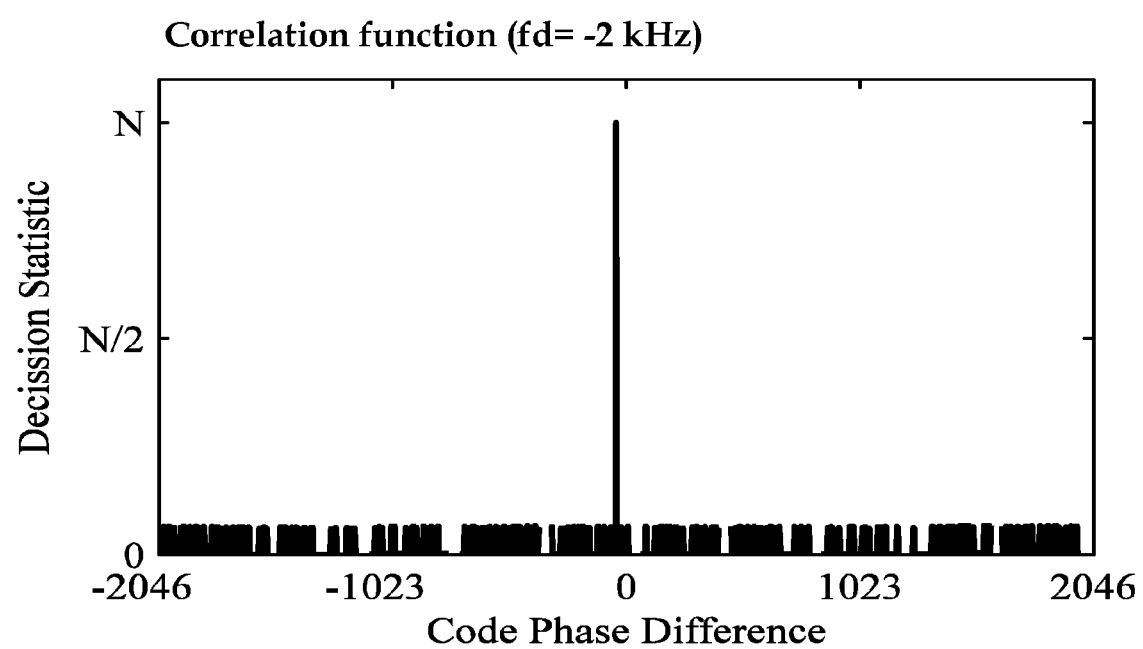

FIGS. 4a-4e show the result of simulations for the same embodiment of FIGS. 3a-e when the starting time is selected such that half of the secondary code Chips during the acquisition interval have equal values for the weak signal and the stronger interfering signal and half of the secondary code Chips have different values. The difference in power between the acquisition signal and the interfering signals is assumed to be 24 dB. FIG. 4a shows a simulation where the relative frequency offset parameter $f_d$ is zero, i.e. the first and second GNSS signals have a same frequency offset. FIGS. 4b and 4c show simulations where the relative frequency offset parameter $f_d$ is equal to +1 kHz (FIG. 4b) and +2 kHz (FIG. 4c). FIGS. 4d and 4e show simulations where the relative frequency offset parameter $f_d$ is equal to −1 kHz (FIG. 4d) and −2 kHz (FIG. 4e). As can be seen, a significant improvement is achieved in that the cross-correlation effects are fully vanished and the autocorrelation peak can be clearly observed. This allows easily to determine the autocorrelation peak and therefore to synchronize to the phase of the primary code for determining the position of the mobile receiver.

Figure 6:
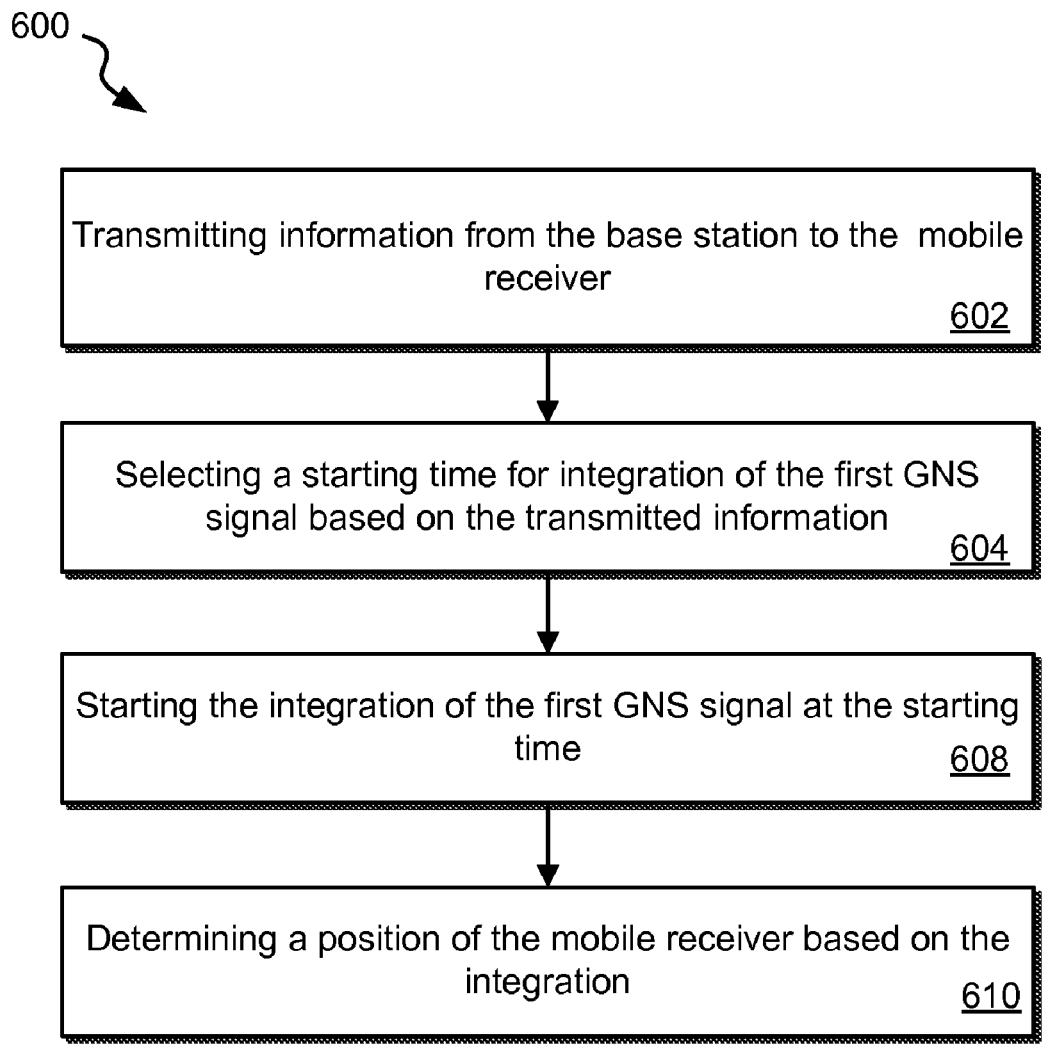
FIG. 6 shows a flow chart diagram according to an embodiment.

Referring now to FIG. 6, an implementation embodiment of a positioning process 600 will be described utilizing the base station 112 for providing information from the base station 112 to the mobile receiver. As described above, the secondary code of the weak first signal, i.e. the first Chip sequence, may not have enough signal strength at the receiver 110 to allow the determining or reconstruction of its code phase (the position in time of the code). The phase information of the secondary code of the weak first signal is however required to select in accordance with the above described the starting point (trigger point) for starting autocorrelation integration for the primary code of the first signal, i.e. the second code. In the embodiment described with respect to FIG. 6, this information will be provided from the base station 112 which receives the first signal with much higher signal strength than the mobile receiver 110.

The process 600 starts at 602 when information is transmitted from a base station 112 to the mobile receiver 110. The transmitted information may in one embodiment be information which indicates directly the starting time of the primary code integration. Therefore, in this embodiment, the starting time will be selected by the base station 112 and the mobile receiver selects the transmitted starting time as starting time for the primary code autocorrelation integration. The selecting of the starting time information at the base station 112 is possible since the base station 112 receives both the first and the second GNSS signals. Because both GNSS signals are received with sufficient strength at the base station 112, according to an embodiment, the base station 112 can determine the phase-offset (phase difference) between the secondary codes of the two GNSS signals, i.e. the phase difference between the first and the third Chip sequence and may use one of the above described algorithm or processes to select the integration starting time as described above. In order to select the starting time, the base station 112 may assume a length of the integration time interval which is sufficient for the integration at the mobile receiver. In other embodiments, the base station 112 may have received a value for the length of the integration interval from the mobile receiver and the base station 112 may use the received integration interval length for determining (calculating) the starting time.

At 604, the mobile receiver selects a starting time for integrating a first GNSS signal associated with a first satellite based on the transmitted information. As outlined above, in case the starting time is determined by the base station 112 and transferred from the base station 112 to the mobile receiver, the mobile receiver will select the transferred starting time. In other embodiments, the mobile receiver may know the identities of the two GNSS signals (i.e. which GNSS signals are received or to which satellites the received signals correspond to) and determine a phase difference between the two secondary codes of the two GNSS signals based on the received information. The mobile receiver then selects in this embodiment the starting time based on these parameters by using one of the above described algorithms or processes.

At 606, the mobile receiver starts at the starting time an integration of the GNSS signal. As described above, the integration may be the autocorrelation integration for the primary code of the first weak signal (second code). In one embodiment, the integration is an integration of an acquisition in a single-shot positioning.

The mobile receiver then determines at 608 a position based on the integration of the GNSS signal. It is to be noted that according to an embodiment, the process 600 may start after the mobile receiver 110 has tried to perform an acquisition utilizing conventional acquisition techniques. During this process, synchronization to the second stronger GNSS signal may be performed.

After failing with the conventional acquisition, the mobile receiver 110 transmits to the base station 112 a request for transmitting the information from the base station 112 to the mobile receiver 110. Based on the request from the mobile receiver 110, the base station 112 transmits the information in step 602. The mobile receiver 112 switches from the conventional acquisition mode to an acquisition mode utilising the process 600 and performs blocks 604 and 606 and 608 as described above to determine the position.

While the above has been described for illustration for two GNSS signals corresponding to two satellites, it is to be understood that the embodiments can be equally be applied to a plurality of GNSS signals of more than two. Here, the plurality of GNSS signals may include one or more weak signals and/or one or more strong signals.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information. The term "entity" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity. For example, specific embodiments described herein described herein to be implemented in a transmitter, receiver or transceiver may be implemented in sub-entities such as a chip or a circuit provided in such an entity.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim.

It is further to be noted that methods disclosed in the specification or in the claims may be implemented by a device having means for performing each of the respective steps of these methods.

What is claimed is:

1. A method comprising:
   receiving a first global navigation satellite system signal associated with a first satellite, the first global navigation satellite system signal having modulated thereon a first Chip sequence associated with a first direct-sequence spreading code and a second Chip sequence associated with a second direct-sequence spreading code, the first spreading code having a first code time period and the second spreading code having a second code time period, the first code time period being longer than the second code time period;
   receiving a second global navigation satellite system signal associated with a second satellite, the second global navigation satellite system signal having modulated thereon a third Chip sequence associated with the first spreading code and a fourth Chip sequence associated with the second spreading code;
   selecting a starting time for integration of the first global navigation satellite system signal dependent on a characteristic of the first Chip sequence relative to the third Chip sequence;
   integrating the first global navigation satellite system signal based on the selected starting time; and
   code phase synchronizing to the first global navigation satellite system signal based on the integrating of the first global navigation satellite system signal.

2. The method according to claim 1, wherein the selecting of the starting time comprises:
   providing a prediction of the first Chip sequence for at least an integration time period; and
   selecting the starting time based on the characteristic of the prediction of the first Chip sequence during said integration time period and a characteristic of the third Chip sequence during said integration time period.

3. The method according to claim 1, wherein the starting time is selected such that a parameter is at a minimum or a local minimum or at least near a minimum or a local minimum for the selected starting time compared to other potential starting times, the parameter being dependent on the characteristic of the first Chip sequence for a time interval after the starting time relative to the third Chip sequence for said time interval.

4. The method according to claim 3, wherein each Chip of the first and third Chip sequence represents either a value +1 or a value −1, wherein the parameter represents a measure for the dot product of the values of the first Chip sequence and the third Chip sequence integrated over an integration time period.

5. The method according to claim 1, wherein the first global navigation satellite system signal is weaker than the second global navigation satellite system signal.

6. The method according to claim 1, wherein information indicating the starting time is determined at a base station, the information being further transmitted to a mobile receiver, the mobile receiver receiving the first and second global navigation satellite system signals.

7. The method according to claim 1, further comprising: providing a synchronization to the second global navigation satellite system signal prior to the integration of the first global navigation satellite system signal and providing a navigation based on the synchronization to the first global navigation satellite system signal and the synchronization to the second global navigation satellite system signal.

8. A method comprising:
selecting at a device a starting time for integrating a first global navigation satellite system signal associated with a first satellite based on a characteristic of a first Chip sequence of the first global navigation satellite system relative to a third Chip sequence, the first global navigation satellite system signal being modulated by the first Chip sequence associated with a first spreading code and a second Chip sequence associated with a second spreading code, the first spreading code having a longer time period than the second spreading code;
starting at the starting time an integration of the first global navigation satellite system signal; and
determining a position based on the integration of the first global navigation satellite system signal.

9. The method according to claim 8, further comprising:
receiving a second global navigation satellite system signal associated with a second satellite, the second navigation satellite signal being modulated by the third Chip sequence associated with the first spreading code and a fourth Chip sequence associated with the second spreading code; and
selecting the starting time based on the characteristic of the first Chip sequence of the first global navigation satellite system signal during a time interval with respect to the third Chip sequence of the second global navigation satellite system signal during said time interval.

10. The method according to claim 8, wherein the starting time is selected such that a parameter is at a minimum or a local minimum or at least near a minimum or a local minimum for the selected starting time compared to other potential starting times, the parameter being dependent on the characteristic of the first Chip sequence for an integration time interval after the starting time relative to the third Chip sequence for said integration time interval.

11. The method according to claim 10, wherein a difference of a first value and a second value is at a minimum or a local minimum for the selected starting time compared to other potential starting times, the first value representing a total time duration within the time interval during which the first Chip sequence and the third Chip sequence have a same value and the second value representing a total time duration within the time interval during which the first Chip sequence and the third Chip sequence have a different value.

12. The method according to claim 8, further comprising: transmitting information from a base station to the device; selecting the starting time at the base station; and wherein the information transmitted to the device indicates the selected starting time.

13. The method according to claim 12, wherein the information comprises information allowing a prediction in time of at least a part of the received first Chip sequence, the method further comprising: selecting the starting time at the device based on the received information.

14. The method according to claim 8, wherein the second spreading code is a primary code for global navigation satellite system signals and the first code is a secondary code for global navigation satellite system signals.

15. The method according to claim 8, wherein the first and second Chip sequences are predetermined Chip sequences, wherein integrating the first global navigation satellite system signal includes applying the predetermined second Chip sequence associated with the first satellite to the received first global navigation satellite system signal.

16. A system comprising:
a base station, the base station being configured to transmit information to a mobile receiver;
the mobile receiver configured to select a starting time for integrating a first global navigation signal associated with a first satellite based on the transmitted information, the first global navigation satellite system signal being modulated by a first Chip sequence associated with a first spreading code and a second Chip sequence associated with a second spreading code, the first spreading code having a longer time period than the first spreading code, the mobile receiver further being configured to receive a second global navigation satellite system signal associated with a second satellite, the second navigation satellite signal being modulated by a third Chip sequence associated with the first spreading code and a fourth Chip sequence associated with the second spreading code, the mobile receiver further being configured to select the starting time based on the characteristic of the first Chip sequence of the first global navigation satellite system signal during a time interval with respect to the third Chip sequence of the second global navigation satellite system signal during said time interval.

17. The system according to claim 16, wherein a parameter is at a minimum or a local minimum for the selected starting time compared to other potential starting times, the parameter being dependent on the characteristic of the first Chip sequence in an integration time interval after the starting time relative to the third Chip sequence in said integration time interval.

18. The system according to claim 17, wherein the starting time is selected such that the difference of a first value and a second value is at a minimum or a local minimum compared to other potential starting times, the first value representing a total time duration within the time interval during which the first Chip sequence and the third Chip sequence have a same value and the second value representing a total time duration within the time interval during which the first Chip sequence and the third Chip sequence have a different value in the time interval after the starting time.

19. The system according to claim 16, wherein the base station is configured to determine the starting time at the base station and wherein the information transmitted to the mobile receiver indicates the determined starting time.

20. The method according to claim 16, wherein the information comprises information allowing a prediction of a receive time of at least a part of the received first Chip sequence, and wherein the mobile receiver is configured to determine the starting time at the mobile receiver based on the received information.

21. A device comprising:
a physical computing entity, the computing entity being configured to determine a starting time for integrating a first global navigation satellite system signal associated with a first satellite, the first global navigation satellite system signal being modulated by a first Chip sequence associated with a first direct-sequence spreading code and a second Chip sequence associated with a second direct-sequence spreading code, the first direct-sequence spreading code having a longer time period than the second direct-sequence spreading code, wherein the computing entity is further configured to select the starting time based on a characteristic of the first Chip sequence during a time interval relative to a third Chip sequence during the time interval,
wherein a second global navigation satellite signal is associated with a second satellite and the third Chip sequence is associated with the first direct-sequence spreading code.

22. The device according to claim 21, wherein the computing entity is configured to select the starting time such that the difference of a first value and a second value is at a minimum or a local minimum or at least near a minimum or a local minimum for the selected starting time compared to other potential starting times, the first value representing a total time duration within an integration time interval during which the first Chip sequence and the third Chip sequence have a same value and the second value representing a total time duration within the integration time interval during which the first Chip sequence and the third Chip sequence have a different value in the time interval after the starting time.

23. A computer programme with a computer code executable on a computer, the computer code stored on a non-transitory tangible media of the computer, the computer code when executed on the computer provides selecting a starting time for integrating a first global navigation satellite system signal associated with a first satellite, the first global navigation satellite system signal being modulated by a first Chip sequence associated with a first spreading code and a second Chip sequence associated with a second spreading code, the first spreading code having a longer time period than the second spreading code, wherein the starting time is selected based on a characteristic of the modulated first Chip sequence relative to a modulated third Chip sequence, a second global navigation satellite system signal being associated with a second satellite, and the third Chip sequence being associated with the first spreading code.

24. The computer programme according to claim 23, wherein the starting time is selected such that a parameter indicative of a characteristic of the first Chip sequence and the third Chip sequence during a time interval after the starting time is at a minimum or local minimum or at least near a minimum or near a local minimum compared to other potential starting times.

25. The computer programme according to claim 23, wherein the starting time is selected such that the difference of a first value and a second value is at a minimum or a local minimum or at least near a minimum or local minimum for the selected starting time compared to other potential starting times, the first value representing a total time duration within the time interval during which the first Chip sequence and the third Chip sequence are at a same value, the second value representing a total time duration within the time interval during which the first Chip sequence and the third Chip sequence are at a different value.

* * * * *